Jan. 27, 1925.
E. C. CLARKE
1,524,536
CLUTCH CONTROLLING MECHANISM
Filed Oct. 24, 1921
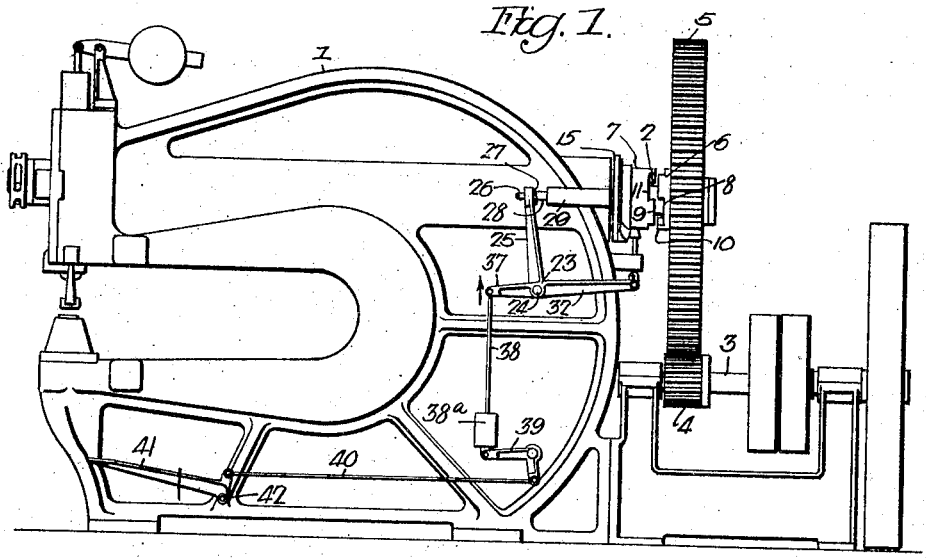
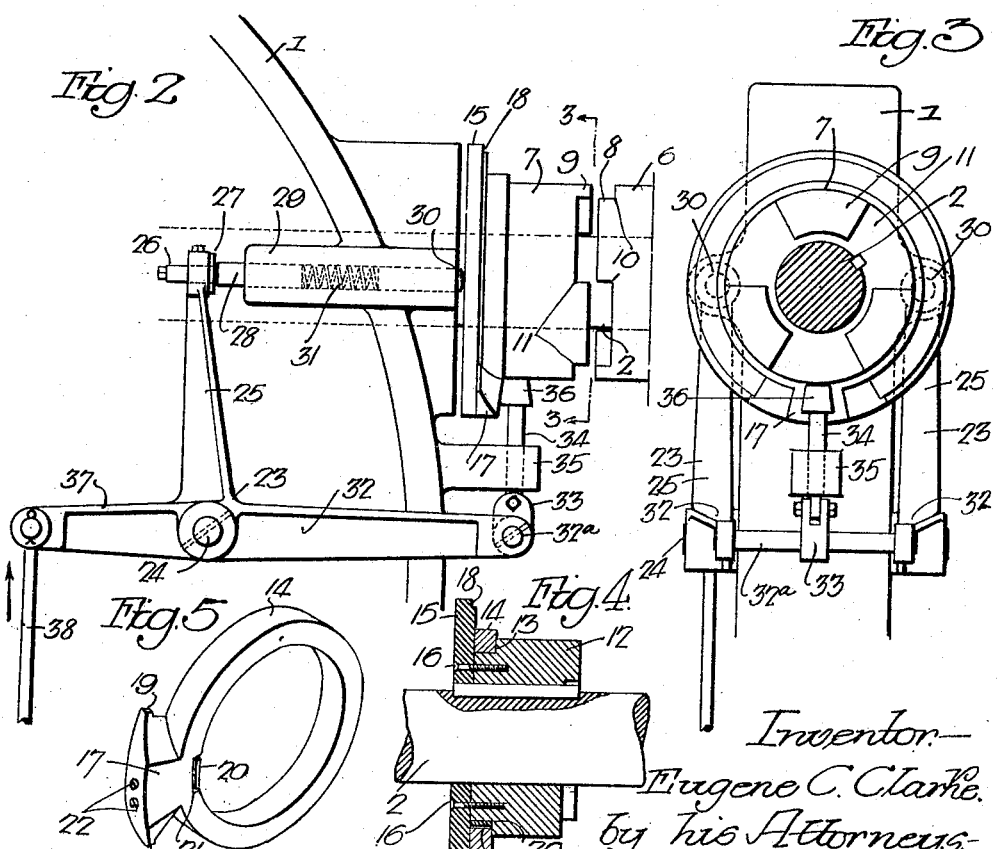
Inventor—
Eugene C. Clarke.
by his Attorneys.
Howson & Howson.

Patented Jan. 27, 1925.

1,524,536

UNITED STATES PATENT OFFICE.

EUGENE C. CLARKE, OF CHAMBERSBURG, PENNSYLVANIA, ASSIGNOR TO CHAMBERSBURG ENGINEERING COMPANY, OF CHAMBERSBURG, PENNSYLVANIA, A CORPORATION OF PENNSYLVANIA.

CLUTCH-CONTROLLING MECHANISM.

Application filed October 24, 1921. Serial No. 509,865.

*To all whom it may concern:*

Be it known that I, EUGENE C. CLARKE, a citizen of the United States, residing in Chambersburg, Pennsylvania, have invented Clutch-Controlling Mechanism, of which the following is a specification.

My invention relates to improvements in clutch controlling mechanism, the object of the invention being the provision of certain new and improved features of mechanism hereinafter fully described.

A clearer understanding of the invention will be had from the attached drawings, in which:

Figure 1, is a side elevation of a punching machine equipped with a clutch controlling mechanism made in accordance with my invention;

Fig. 2, is a fragmentary enlargement of a portion of the machine illustrating details of the clutch mechanism;

Fig. 3, is a section on the line 3—3, Fig. 2;

Fig. 4, is a longitudinal section of the movable element of the clutch mechanism, and Fig. 5, is a view in perspective of the cam ring constituting one of the elements of the clutch mechanism.

With reference to the drawings, 1 represents the frame of a punching machine, in which is mounted a main operating shaft 2, said shaft being driven in the present instance from a shaft 3 through a pinion 4 mounted on the latter shaft, a gear wheel 5 loosely mounted upon the shaft 2, and clutch mechanism, to be described hereinafter, associated with the shaft 2 and with the gear wheel 5, the shaft 3 being operatively connected with a suitable external source of power (not shown).

The clutch mechanism in the present instance comprises an element 6 secured to or forming a part of the gear wheel 5 and a relative movable element 7 splined to the shaft 2 to permit movement of the said element longitudinally of the shaft while preventing relative rotation. The elements 6 and 7 have in their abutting faces corresponding projections or teeth 8 and 9, and recesses 10 and 11, the teeth of the respective elements interlocking when the elements are brought together whereby rotational movement of one is transmitted to the other.

The clutch element 7 comprises in the present instance a main member 12 which contains the teeth 9 and recesses 11, and which is splined to the shaft 2, said element having at its rear edge an annular recess 13 for the reception of a cam ring 14, which latter is retained in the recess by means of a follower plate or flange 15, which latter is secured to the rear face of the member 12 by means in the present instance of bolts or screws 16. The cam ring 14, which is best illustrated in Fig. 5, consists of a main ring-shaped portion, from the periphery of which at one side extends a cam element 17, which latter at its center portion extends across the complete width of the ring but tapers at each side rearwardly from the front to the rear edge of the ring.

As clearly illustrated in Fig. 2, the outer face of the cam element 17 corresponds substantially with the face of the flange 15, and the latter element has at the forward outer edge thereof an annular recess 18, the cam element 17 having at the rear an outer edge thereof an arcuate lug or projection 19 which fits within the said recess 18.

As illustrated in Figs. 4 and 5, releasable means is provided for securing the cam ring 14 to the member 12, said means comprising in the present instance a clamp consisting of a plate or shoe 20 mounted in a recess 21 in the inner periphery of the ring 14, which plate or shoe is adapted to be forced against the bottom of the recess 13 by means of screws or bolts 22, 22, extending into the base of the recess 21 behind the shoe 20 from the outer end surface of the cam element 17.

The mechanism which controls the movement of the element 7 into and clear of engagement with the element 6, comprises in the present instance a pair of three-armed bell crank levers 23, 23, which are carried on the opposite ends of a rod 24 suitably mounted in the frame 1 of the machine. One arm 25 of each of the levers 23 extends substantially vertically upward and has adjustably secured in its outer end an element 26 comprising a member 27 which bears against one end of a pin or rod 28 slidably mounted in a tubular guide 29 on the frame 1. A second pin or rod 30 is mounted in the opposite end of the said tubular guide, and a spring 31 is confined between the inner ends of the pin 28 and the pin 30. The outer ends of the pins 30 are adapted to bear against the rear or outer face of the flange plate 15, and it is through the medium of the arms 25 of the levers 23, the pins 28 and 30, and the springs 31 that the element 7 is advanced into engagement with the element 6.

A second arm 32 of each of the levers 23 extends forwardly in a substantially horizontal position, the respective arms 32 being connected at their outer ends by a rod 32ª extending therebetween, said rod being connected by means of a suitable link 33 with the lower end of a pin 34 mounted for vertical reciprocation in a guide 35 on the frame 1. Preferably there is upon the upper end of the pin 34 a roller 36 which is adapted to engage the element 7 in a manner to be described hereinafter. It is through the medium of the arms 32 of the levers 23, and the rod 32ª, the link 33, the pin 34, and suitable co-operating elements upon the clutch element 7, that the latter element is withdrawn from engagement with the element 6.

The third arm 37 of one of the levers 23 extends rearwardly in substantial alignment with the arm 32, and has connected to its outer end suitable operating mechanism consisting in the present instance of a weighted rod 38, a bell crank lever 39 pivotally mounted upon the frame 1 of the machine, a connecting rod 40, and a treadle 41, which latter is pivotally secured at 42 to the frame 1. It will be noted that depression of the treadle 41 will effect, through the various connecting links, an upward motion, in the direction of the arrow in the drawings, of the rod 38, and a consequent oscillation of the levers 23 in a clockwise direction.

The operation of the device is as follows: When it is desired to put the machine into operation, the treadle 41 is depressed, with the result, as previously described, that the levers 23 are oscillated in a clockwise direction, this having the effect coincidently of compressing the spring 31 and moving the pin 34 with its roller 36 downwardly clear of the element 7. Compression of the springs 31 puts a pressure through the pins 30 upon the rear of the element 7 sufficient to shift it forwardly and into engagement with the element 6 immediately upon release of the element 7 by the pin 34. During operation of the machine, the parts remain in these relative positions, the springs 31 exerting continuous pressure upon the element 7 tending to retain it in engagement with the element 6.

When it is desired to suspend operation of the machine, release of the treadle effects, through the medium of a weight 38ª upon the rod 38, a counterclockwise movement of the levers 23, which coincidently decreases the pressure upon the springs 31 and elevates the pin 34 into engagement with the element 7, the relative position of the element 7 in its operating position being such that when the said pin is elevated, the top end of the pin will abut the outer surface of the ring 14, the side of the roller 36 lying against the forward face of the flange plate 15.

As the element 7 rotates the roller 36, or in cases where the roller is eliminated, the end of the pin 34 is met by the inclined side face of the cam element 17, the effect of the co-action between the inclined surface and the fixed pin being to shift the element 7 rearwardly and clear of engagement with the element 6.

It will be noted that the cam ring 14 is thicker than the depth of the recess 13 of the member 12 which it occupies, and that it accordingly extends beyond the face of this member 12. As previously stated, when the pin 34 is elevated to disengage the element 7 from the element 6, the end of the pin bears against the face of the ring 14. When, however, the end of the pin passes up on the cam element 17 to the forward face thereof, the pin 34 is permitted to elevate until its end bears against the surface of the member 12 of the clutch element 7. In the position occupied by the lever 23, when the end of the pin 34 is bearing against the periphery of the ring 14, the spring 31 is not completely relaxed, there being still sufficient pressure upon the spring to insure the retention of the element 7 in engagement with the element 6; but when the upward movement of the pin 34 is completed, as when the pin lies against the forward face of the cam element 17, this slight pressure upon the spring is entirely removed.

It will be understood that this control mechanism in the form herein illustrated, or modified within the scope of the invention, may find numerous applications other than that herein described.

I claim:

1. The combination of a clutch having a movable member; a relatively fixed guide; an element in said guide adapted to engage the rear of the movable member to advance it into power-transmitting position; a second element in said guide; a spring confined between said elements; a third element adapted to engage the front of the movable clutch member to withdraw the latter; and a single operating member operatively associated with the said second and third elements.

2. The combination of a clutch having a movable member; a relatively fixed guide; an element in said guide adapted to engage one side of the movable member to advance it into power transmitting position; a second element adapted to engage the other side of the movable member to release it from power transmitting position; a spring adapted to act upon said first element to force it into engagement with the movable member and a member operatively associated with both the second element and spring and adapted simultaneously to render the said second element inoperative and to compress the spring against the said first element and vice versa.

EUGENE C. CLARKE.